(12) United States Patent
Langberg et al.

(10) Patent No.: US 7,764,752 B2
(45) Date of Patent: Jul. 27, 2010

(54) METHOD AND SYSTEM FOR REDUCING INTERFERENCES DUE TO HANDSHAKE TONES

(75) Inventors: Ehud Langberg, Wayside, NJ (US);
Patrick Duvaut, Tinton Falls, NJ (US);
Peter Kleewein, Eatontown, NJ (US);
Wolfgang Kleewein, legal representative, Vienna (AT); Laurent Pierrugues, Tinton Falls, NJ (US)

(73) Assignee: Ikanos Communications, Inc., Fremont, CA (US)

(*) Notice: Subject to any disclaimer, the term of this patent is extended or adjusted under 35 U.S.C. 154(b) by 1525 days.

(21) Appl. No.: 10/672,079

(22) Filed: Sep. 29, 2003

(65) Prior Publication Data

US 2004/0114678 A1    Jun. 17, 2004

Related U.S. Application Data

(60) Provisional application No. 60/413,779, filed on Sep. 27, 2002.

(51) Int. Cl.
*H03D 1/04* (2006.01)
*H04B 1/10* (2006.01)

(52) U.S. Cl. .................. 375/346; 375/222; 375/229; 375/350

(58) Field of Classification Search ............ 375/222, 375/229–236, 350, 346
See application file for complete search history.

(56) References Cited

U.S. PATENT DOCUMENTS

| 4,905,254 A | * | 2/1990 | Bergmans .............. 375/233 |
|---|---|---|---|
| 4,995,104 A | | 2/1991 | Gitlin |
| 5,652,799 A | * | 7/1997 | Ross et al. ............ 381/71.11 |
| 5,777,692 A | * | 7/1998 | Ghosh .................... 348/725 |
| 6,628,704 B1 | * | 9/2003 | Long et al. .............. 375/219 |
| 6,934,345 B2 | * | 8/2005 | Chu et al. ............... 375/346 |
| 7,042,969 B2 | * | 5/2006 | Lai ......................... 375/348 |
| 2002/0094043 A1 | | 7/2002 | Chu et al. |
| 2002/0136397 A1 | | 9/2002 | Zeng et al. |
| 2004/0141550 A1 | * | 7/2004 | Duvaut et al. .......... 375/220 |

OTHER PUBLICATIONS

International Search Report dated Feb. 5, 2004 for Application No. PCT/US03/30482.

* cited by examiner

*Primary Examiner*—Curtis B Odom
(74) *Attorney, Agent, or Firm*—Thomas, Kayden, Horstemeyer & Risley, LLP

(57) ABSTRACT

A method and system of the present inventions reduces both near-end crosstalk (NEXT) and far-end crosstalk (FEXT) interferences due to handshake tones into upstream and downstream neighboring services, both at the customer premises equipment (CPE) and at the central office (CO), when handshake is experienced. An embodiment of the present inventions is directed to significantly reduce the NEXT and/or FEXT interferences due to handshake tones. For example, NEXT and/or FEXT interferences due to G.994.1 handshake tones, identified as, bins 7 and 9 for the Upstream channel and bins 12, 14 and 64 for the Downstream channel may be reduced. An embodiment of the present inventions provides an algorithm that may be used for both NEXT and FEXT Handshake Interferences reduction at the CO and at the CPE. In addition, the algorithm may operate in the time domain and in the frequency domain. Frequency domain algorithm offers two options, both versions taking advantage of the high correlation time of the Handshake tone signals.

26 Claims, 6 Drawing Sheets

METHOD AND SYSTEM FOR REDUCING INTERFERENCES DUE TO HANDSHAKE TONES

CROSS-REFERENCE TO RELATED APPLICATIONS

This patent application claims priority to U.S. Provisional Patent Application No. 60/413,779, filed Sep. 27, 2002, which is hereby incorporated by reference herein in its entirety.

FIELD OF THE INVENTION

The present invention relates generally to reducing interferences due to handshake tones, more particularly, to a method and system for reducing near end crosstalk (NEXT) and far end crosstalk (FEXT) interferences due to handshake tones in the frequency domain.

BACKGROUND OF THE INVENTION

With the increasing popularity of the Internet and other content-heavy electronic communication systems, there has been a substantial need for reliable and affordable high bandwidth mediums for facilitating data transmissions between service providers and their customers. In relation to the requirement that such mediums be affordable to consumers, a cost-effective manner for providing service to customers involves using infrastructure already present in most locations. Accordingly, over recent years, the two such mediums most widely meeting these requirements include cable television (CATV) and conventional copper wire telephone systems (plain old telephone system or POTS).

Relating specifically to the adaptation of POTS telephone lines to carry data at high-bandwidth or 'broadband' data rates, a number of Digital Subscriber Line (DSL) standards and protocols have been proposed. DSL essentially operates by formatting signals using various Time Domain Equalization techniques to send packets over copper wire at high data rates. A substandard of conventional DSL is known as Asymmetric Digital Subscriber Line (ADSL) and is considered advantageous for its ability to provide very high data rates in the downstream (i.e., from service provider to the user) direction by sacrificing speed in the upstream direction. Consequently, end user costs are minimized by providing higher speeds in the most commonly used direction. Further, ADSL provides a system that applies signals over a single twisted-wire pair that simultaneously supports conventional POTS or Integrated Services Digital Network (ISDN) service as well as high-speed duplex (simultaneous two-way) digital data services.

Two of the proposed standards for ADSL are set forth by the International Telecommunications Union, Telecommunication Standardization Section (ITU-T). A first, conventional, ADSL standard is described in ITU-T Recommendation G.992.1—"Asymmetric Digital Subscriber Line (ADSL) Transceivers", the body of which is incorporated herein by reference. A second, more recently proposed standard is the G.992.2 or 'G.lite' standard, further described in ITU-T Recommendation G.992.2—"Splitterless Asymmetric Digital Subscriber Line (ADSL) Transceivers", also bodily incorporated by reference herein. The G.lite standard is a variant of the G.992.1 standard, with modifications directed primarily to work in a splitterless environment (i.e., without a splitter at the remote user end to separate the voice traffic from the digital data traffic).

Prior to any transmission of actual data between the CO (ADSL Transceiver Unit-Central (ATU-C)) and the remote computer (ADSL Transceiver Unit-Remote (ATU-R)), the two entities must first undergo a initialization procedure designed to familiarize the two entities with each other, identify the bandwidth capabilities for the current session, and further facilitate the establishment of a valid connection. Pursuant to ADSL standards provided by the International Telecommunication Union-Telecommunication Standardization Sector (ITU-T), these initialization procedures comprise the following: 1) a handshake procedure; 2) a transceiver training session; 3) a channel analysis session; 4) an exchange session; and finally 5) an actual data transmission session referred to as 'showtime'.

Specifics of the handshake procedure are set forth in ITU-T Recommendation G.994.1 —"Handshake Procedures for Digital Subscriber Line (DSL) Transceivers", the body of which is incorporated by reference herein. The handshake procedure is designed to enable peer components to initiate a communications session between each other and generally includes the exchange of several specific types of messages having predetermined formats. Examples of such messages include the following: capabilities list and capabilities list request messages; mode select and mode request messages; various acknowledge and negative acknowledge messages, etc. Each of the above messages is generally formulated by a protocol processor responsible for making sure that the requirements for protocol communication are complied with.

Because the various ITU-T recommendations identified above are designed to provide guidance to ADSL developers in various geographic locations, different circumstances may exist which impact the method with which the general recommendations are implemented. Accordingly, Annexes have been created to each specification that specifically itemize the effect of particular scenarios upon the adoption of the general recommendations. Of particular interest in the present application is the effect of a large network of conventional TCM-ISDN (Time Compression Multiplex ISDN) telephone lines on ADSL development. Annex C of the G.992.1 Recommendation directly relates to such circumstances. Due to noise and other interference generated by these ISDN systems, as well as the potential adverse impact ADSL deployment may have on these existing systems, relatively severe performance limitations have been placed upon ADSL implementation in these regions.

Crosstalk generally refers to disturbance on one twisted pair due to signals on another twisted pair. Usually, the twisted pairs are in the same cable or bundle. Crosstalk is generally characterized as NEXT or FEXT. NEXT is characterized by a disturbing pair's source being local to the disturbed pair's receiver, the disturbing pair referring to the twisted pair causing the disturbance and the disturbed pair referring to the twisted pair being disturbed. In this case, the disturbing signal starts down the disturbing pair, couples into the disturbed pair and then propagates back to the disturbed pair's receiver. FEXT is characterized by the disturbing pair's source being distant from the disturbed pair's receiver. In this case, the disturbing signal propagates down the disturbing pair, crosstalks into the disturbed pair and propagates the rest of the distance along the disturbed pair into the disturbed pair's receiver.

Handshake tones FEXT and NEXT interferences into neighboring ADSL services sharing the same bundle may cause significant signal to noise ratio drop, leading to errors that may not be handled by an error correcting system. On existing ADSL Customer premise equipment (CPE) and central office (CO) modems, these handshake interferences are not mitigated.

Therefore, there is a need in the art of ADSL systems for a more efficient method and system for reducing interferences due to handshake tones.

SUMMARY OF THE INVENTION

Aspects of the present inventions overcome the problems noted above, and realize additional advantages. A method and system of the present inventions reduces both NEXT and FEXT interferences due to handshake tones into upstream and downstream neighboring services, both at the CPE and at the CO, when handshake is experienced. The present inventions may be applied both in the time domain and in the frequency domain.

In accordance with an exemplary embodiment, a method for reducing interference due to handshake tones in the frequency domain comprising the steps of receiving an input signal in the frequency domain having a short correlation time component and a long correlation time component; generating a delayed signal by delaying the input signal by a delay value; generating a prediction signal based at least in part on the delayed signal; comparing the input signal and the prediction signal; and minimizing a variance between the input signal and the prediction signal.

In accordance with other aspects of this exemplary embodiment, the input signal is a corrupted frequency domain ADSL signal at a predetermined bin of a predetermined time-symbol; the delay value is a time-symbol value; the delay value is one symbol, wherein the one symbol represents approximately 512 time domain samples; the delay value comprises a predetermined time symbol value; NEXT interferences due to handshake tones are reduced; FEXT interferences due to handshake tones are reduced; the steps are performed at a CPE end; the steps are performed at a CO end; the prediction signal is generated by a causal filter; the causal filter uses historical data to generate the prediction signal; the causal filter uses at least one past disturbance signal to generate the prediction signal; the step of minimizing is performed by at a least mean square algorithm; and the input is correlated to a disturbance signal.

In accordance with another exemplary embodiment, a method for reducing interference due to handshake tones in the frequency domain comprises the steps of receiving an input signal in the frequency domain having a short correlation time component and a long correlation time component; generating an error signal in the frequency domain wherein the error signal comprises the long correlation time component; generating a delayed signal by delaying the error signal by a delay value; generating a prediction signal based at least in part on the delayed signal; comparing the input signal and the prediction signal; and minimizing a variance between the input signal and the prediction signal.

In accordance with other aspects of this exemplary embodiment, the prediction signal is a prediction of a disturbance signal; the disturbance signal is the long correlation time component; the error signal comprises a residual noise component; the error signal is generated by demodulating the input signal; NEXT interferences due to handshake tones are reduced; FEXT interferences due to handshake tones are reduced; the steps are performed at a CPE end; the steps are performed at a CO end; the prediction signal is generated by a causal filter; the causal filter uses historical data to generate the prediction signal; the causal filter uses at least one past disturbance signal to generate the prediction signal; the step of minimizing is performed by a least mean square algorithm; the input is correlated to a disturbance signal.

In accordance with another exemplary embodiment, a system for reducing interference due to handshake tones in the frequency domain comprises an input for receiving an input signal in the frequency domain having a short correlation time component and a long correlation time component; a delay module for generating a delayed signal by delaying the input signal by a delay value; and a filter for generating a prediction signal based at least in part on the delayed signal; wherein the input signal and the prediction signal are compared and a variance between the input signal and the prediction signal is minimized.

In accordance with another exemplary embodiment, a system for reducing interference due to handshake tones in the frequency domain comprises an input for receiving an input signal in the frequency domain having a short correlation time component and a long correlation time component; a module for generating an error signal in the frequency domain wherein the error signal comprises the long correlation time component; a delay module for generating a delayed signal by delaying the error signal by a delay value; and a filter for generating a prediction signal based at least in part on the delayed signal; wherein the input signal and the prediction signal are compared and a variance between the input signal and the prediction signal is minimized.

The accompanying drawings, which are incorporated in and constitute a part of this specification, illustrate various embodiments of the inventions and, together with the description, serve to explain the principles of the inventions.

BRIEF DESCRIPTION OF THE DRAWINGS

The present inventions can be understood more completely by reading the following Detailed Description of the Invention, in conjunction with the accompanying drawings, in which.

DETAILED DESCRIPTION OF THE INVENTION

Figure 1:
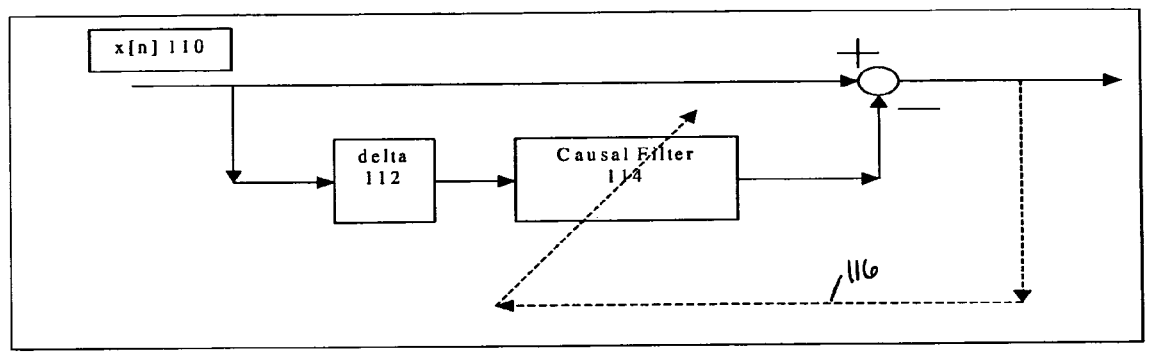
FIG. 1 is a diagram illustrating a time domain handshake tones crosstalk canceller according to an embodiment of an aspect of the present inventions.

The following description is intended to convey a thorough understanding of the inventions by providing a number of specific embodiments and details involving interference reduction applications. It is understood, however, that the inventions are not limited to these specific embodiments and details, which are exemplary only. It is further understood that one possessing ordinary skill in the art, in light of known systems and methods, would appreciate the use of the inventions for their intended purposes and benefits in any number of alternative embodiments, depending upon specific design and other needs.

An embodiment of the present inventions is directed to significantly reduce the NEXT and/or FEXT interferences due to handshake tones. For example, NEXT and/or FEXT interferences due to G.994.1 handshake tones, identified as, bins 7 and 9 for the Upstream channel and bins 12, 14 and 64 for the Downstream channel may be reduced. At the CO, NEXT Handshake Interferences into neighboring upstream channels may occur since tones 12 and 13 overlap the ADSL Upstream channel bandwidth, which may range from bin 6 up to bin 31. At the CPE, NEXT Handshake Interferences into neighboring downstream channel may occur in a full bandwidth when an overlap spectrum is used in the neighboring pairs, as is the case for extended reach services and other similar services. Otherwise, handshake side lobe tones (e.g., 7 and 9) may cause interferences into downstream Frequency Division Multiplexing (FDM) system that may expand, for example from bin 32 up to bin 255.

An embodiment of the present inventions provides an algorithm that may be used for NEXT and/or FEXT Handshake Interferences reduction at the CO and/or at the CPE. In addition, the algorithm of an embodiment of the present inventions may operate in the time domain and/or in the frequency domain. The frequency domain algorithm may further include two options (including variations thereof), where both versions take advantage of the high correlation time of the Handshake tone signals. An embodiment of the present inventions does not require access to a disturbance source signal and may thus be considered a blind method.

As understood by various embodiments of the present inventions, white noise is difficult to predict thereby resulting in a low correlation time (e.g., approximately zero). On the other hand, a sinusoidal signal, for example, is a predictable signal exhibiting a high correlation time (e.g., approximately one). In addition, crosstalk signals due to handshake tones, for example, exhibit long correlation times, while a DMT signal similar to a white noise signal exhibits short correlation times. The various embodiments of the present inventions apply the long correlation times and short correlation times of signals to reduce crosstalk interferences due to handshake tones in the time domain and/or frequency domain at the CPE end and/or the CO end.

According to an embodiment of the present inventions, the method and system for reducing interferences due to handshake tones may be performed in the time domain. In this embodiment, x[n] represents a time domain signal, such as an ADSL corrupted signal that comprises a short correlation time component a[n] and a long correlation time component s[n] where the following equation will apply:

$$x[n]=a[n]+s[n].$$

In addition, x[n] may represent other time domain signals. The signal may be taken either from upstream or downstream received signals respectively at the CO and at the CPE, where n represents a discrete time domain index, sampled at a relevant sampling rate. In this example, the sample may be taken from the time domain part of the ADSL receiver chain. In the following equation, an upper bound of the short correlation time a[n] represented by δ is introduced as:

$$\forall \tau \geq \delta, E[a[n]a[n-\tau]] \approx 0$$

where E[.] represents an expected value. A short correlation (e.g., approximately zero) is determined for the short correlation time component when τ is greater than or equal to the upper bound δ. As shown below, the long correlation time component s[n] exhibits significant correlation beyond the upper bound δ:

$$\forall \tau \geq \delta, \frac{|E[s[n]s[n-\tau]]|}{\sigma_s^2} \approx 1-\varepsilon$$

where ε represents an arbitrarily small value. The equation above represents normalized autocorrelation for the long correlation time component. As ε represents a small value, correlation time for s[n] is close to one, thereby demonstrating a high correlation when τ is greater than or equal to the upper bound δ.

FIG. 1 is a diagram illustrating a time domain handshake tones crosstalk canceller according to an embodiment of the present inventions. Based at least in part on the above assumptions, a time domain crosstalk canceller may be implemented in accordance with an embodiment of the present inventions. In this embodiment, delta represents a time shift that is greater than or equal to the upper bound δ.

A shown in FIG. 1, an input signal is received, as shown by 110. The input signal x[n] may be delayed by a delay value, as shown by 112, for generating a delayed signal. The delay value may represent an upper bound δ, which may represent an upper bound of the short correlation time component. The delayed signal may be represented as x[n−δ]. A filter, such as causal filter 114, may receive the delayed signal and generate a prediction signal, as illustrated by 116. A filter may be considered to be a causal filter when its output does not depend on any future inputs. Causal filter 114 may use historical data for generating the prediction signal. For example, the prediction signal may refer to a prediction of a disturbance signal s[n] based on past disturbance signals s[n−τ]. For example, causal filter 114 may receive the delayed signal x[n−δ] and generate the prediction signal s[n], based at least in part on historical data, which may include s[n−τ]. The input signal may then be compared to the prediction signal, where x[n]−s[n]. A difference between the input signal and the prediction signal, which is based in part on the delayed signal, may be determined and minimized by a technique, such as Least Mean Square algorithm or other algorithm. Therefore, the input signal x[n] will be correlated by a disturbance signal (e.g., s[n]).

The received signal is x[n] which is delayed by delta and s[n] is the output of the filter (e.g., prediction filter). The input of the filter is x[n−.delta.]. The output s[n] represents a good estimate of the disturbance signal which is assumed to have long correlation properties. For example, the signal x[n] contains two components where one component has short correlation (e.g., useful part) and another component has a longer correlation (e.g., disturbance).

According to an embodiment of the present inventions, the method and system for reducing interferences due to handshake tones may be performed in the frequency domain. In this embodiment, $X_t[q]$ denotes bin q of a time-symbol t of a corrupted, frequency domain ADSL signal (e.g., after the FEQ for instance). As one DMT signal may be represented by 512 values of n, one value of t may be equal to 512 time domain values of n. Therefore, a shift of one symbol achieves a zero or near zero correlation of the short correlation time component $A_t[q]$ as shown below.

In this example, $X_t[q]$ comprises a short correlation time component $A_t[q]$ and a long correlation time component $S_t[q]$ as illustrated in the following equation:

$$X_t[q]=A_t[q]+S_t[q]$$

In particular, it is determined that:

$$E[A_t[q]A^*_{t-1}[q]] \approx 0$$

and:

$$\frac{|E[S_t[q]S^*_{t-1}[q]]|}{\sigma_q^2} \approx 1 - \varepsilon$$

where $\varepsilon$ represents an arbitrarily small value. As shown above, the short correlation time component $A_t[q]$ is difficult to predict while the long correlation time component $S_t[q]$ is more predictable. An error signal is represented by the following equation:

$$\Sigma_t[q] = W_t[q] + S_t[q].$$

It is assumed that the residual noise $W_t[q]$ inherent to the error signal is white both versus time and frequency.

Figure 2:
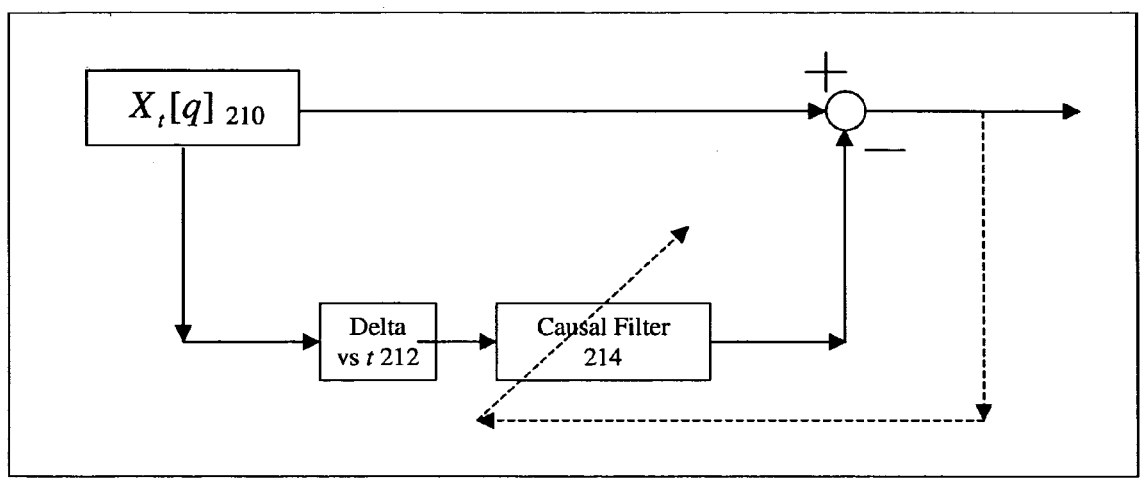
FIG. 2 is a diagram illustrating a frequency domain handshake tones crosstalk canceller applied to a signal according to an embodiment of the present inventions.
Figure 3:
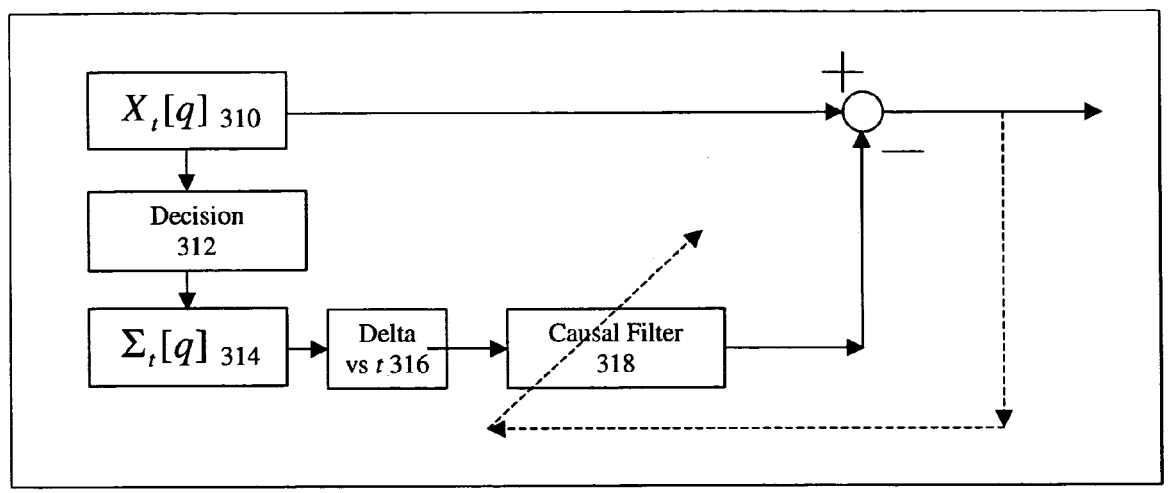
FIG. 3 is a diagram illustrating a frequency domain handshake tones crosstalk canceller applied to an error signal according to an embodiment of the present inventions.

FIG. 2 is a diagram illustrating a frequency domain handshake tones crosstalk canceller applied to a signal according to an embodiment of the present inventions. FIG. 3 is a diagram illustrating a frequency domain handshake tones crosstalk canceller applied to an error signal according to an embodiment of the present inventions. Two frequency domain algorithms may be considered while the algorithm is applied to the signal itself $X_t[q]$, as shown in FIG. 2, or to the error signal $\Sigma_t[q]$, as shown in FIG. 3. Because of the side lobes, any version should be performed for the bins located in the vicinity of the disturber bins. During the handshake, the received SNR are evaluated and the corrupted bins are known, as explained in the handshake standards, e.g., G.994.1.

As shown in FIG. 2, an input signal $X_t[q]$ may be received at 210 in the frequency domain. The input signal may be delayed by a predetermined value t to generate a delayed signal, at delay block 212 where delta represents the delay versus time. The input signal may be delayed by a time-symbol value, such as 1, 2, ... N wherein N is an integer. For example, the values may be stored and selected at the discretion of the user or other entity thereby providing a degree of freedom. The delayed signal may be $X_{t-1}[q]$ or other delay signal, including $X_{t-2}[q], X_{t-3}[q], \ldots X_{t-N}[q]$. Causal filter 214 receives the delayed signal $X_{t-1}[q]$ and generates a prediction signal for predicting disturbance, which may be represented as $S_t[q]$. Causal filter 214 uses historical data $S_{t-1}[q]$ to generate the prediction signal $S_t[q]$. The input signal, represented by 210 may then be compared to the prediction signal, where $X_t[q] - S_t[q]$. A difference between the input signal and the prediction signal may be minimized.

As shown in FIG. 3, an input signal $X_t[q]$ may be received at 310 in the frequency domain. A decision module 312 may demodulate the input signal 310 and generating an error signal $\Sigma_t[q]$, represented by 314. The error signal $\Sigma_t[q]$ may be delayed by a predetermined value t to generate a delayed signal, as shown by 316. The error signal may be delayed by a time-symbol value, such as 1, 2, ... N wherein N is an integer (e.g., $\Sigma_{t-1}[q]$). For example, the values may be stored and selected at the discretion of the user or other entity thereby providing a degree of freedom. Causal filter 318 receives the delayed signal and generates a prediction signal for predicting disturbance which may be represented as $S_t[q]$. The input signal, represented by 310 may then be compared to the prediction signal, where $X_t[q] - S_t[q]$. A difference between the input signal and the prediction signal may be minimized. As appreciated by embodiments of the present inventions, the error signal contains the disturbance signal thereby providing an improved reduction in crosstalk.

Figure 4:
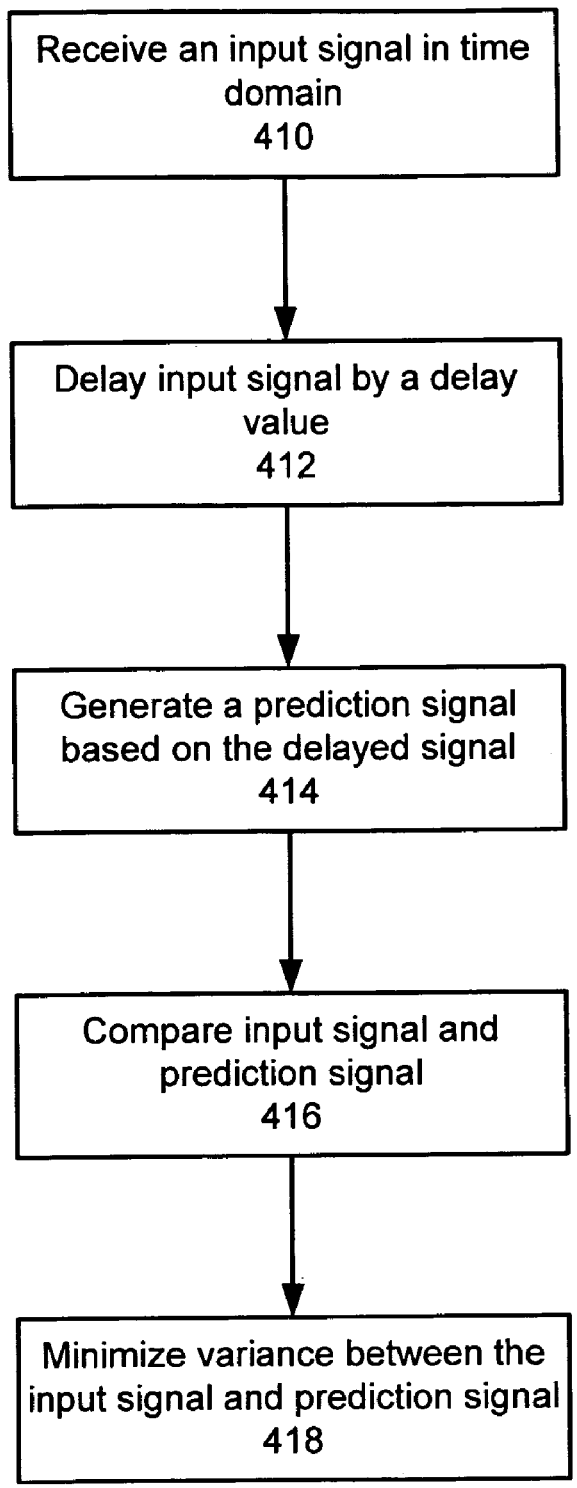
FIG. 4 is a flowchart illustrating a method for reducing interference due to handshake tones in the time domain according to an embodiment of an aspect of the present inventions.

FIG. 4 is a flowchart illustrating a method for reducing interference due to handshake tones in the time domain according to an embodiment of an aspect of the present inventions. At step 410, an input signal may be received in the time domain. The input signal may include a short correlation time component and a long correlation time component. The long correlation time component may exhibit a high correlation value beyond an upper bound of the short correlation time component. At step 412, the input signal may be delayed by a delay value. The delay value may be an upper bound of the short correlation time component. At step 414, a prediction signal may be generated wherein the prediction signal is based at least in part on the delayed signal. For example, the prediction signal may be generated by a causal filter. The causal filter may use historical data to generate the prediction signal. Further, the causal filter may use at least one past disturbance signal to generate the prediction signal. At step 416, the input signal and the prediction signal may be compared. At step 418, the variance between the input signal and the prediction signal may be minimized. The variance may be minimized by an algorithm, such as a least mean square algorithm. In addition, the input signal may be correlated by the disturbance signal.

Figure 5:
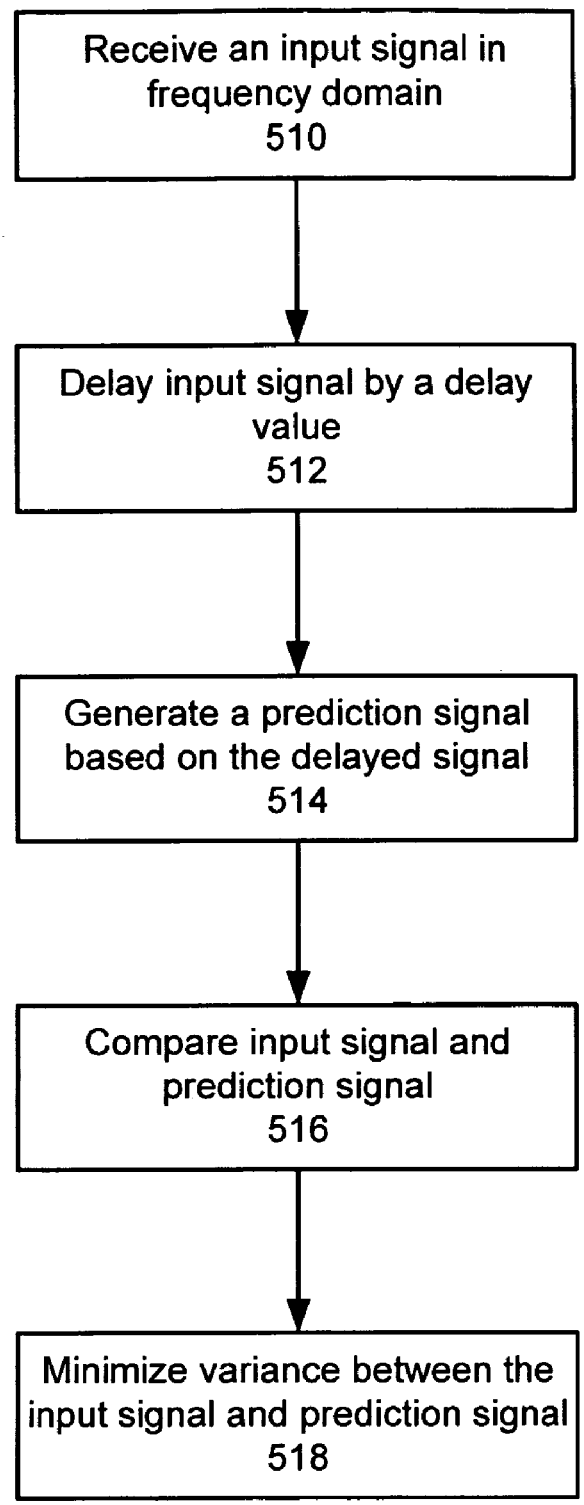
FIG. 5 is a flowchart illustrating a method for reducing interference due to handshake tones in the frequency domain according to an embodiment of the present inventions.

FIG. 5 is a flowchart illustrating a method for reducing interference due to handshake tones in the frequency domain according to an embodiment of the present inventions. At step 510, an input signal may be received in the frequency domain. The input signal may include a short correlation time component and a long correlation time component. At step 512, the input signal may be delayed by a delay value. The delay value may be a predetermined time-symbol value. Further, the delay value may be a symbol wherein the symbol represents approximately 512 time domain samples. As recognized by an embodiment of the present invention, a shift of one symbol achieves a zero or near zero correlation of the short correlation time component, as discussed above. At step 514, a prediction signal may be generated wherein the prediction signal is based at least in part on the delayed signal. For example, the prediction signal may be generated by a causal filter. The causal filter may use historical data to generate the prediction signal. Further, the causal filter may use at least one past disturbance signal to generate the prediction signal. At step 516, the input signal and the prediction signal may be compared. At step 518, the variance between the input signal and the prediction signal may be minimized. The variance may be minimized by an algorithm, such as a least mean square algorithm.

Figure 6:
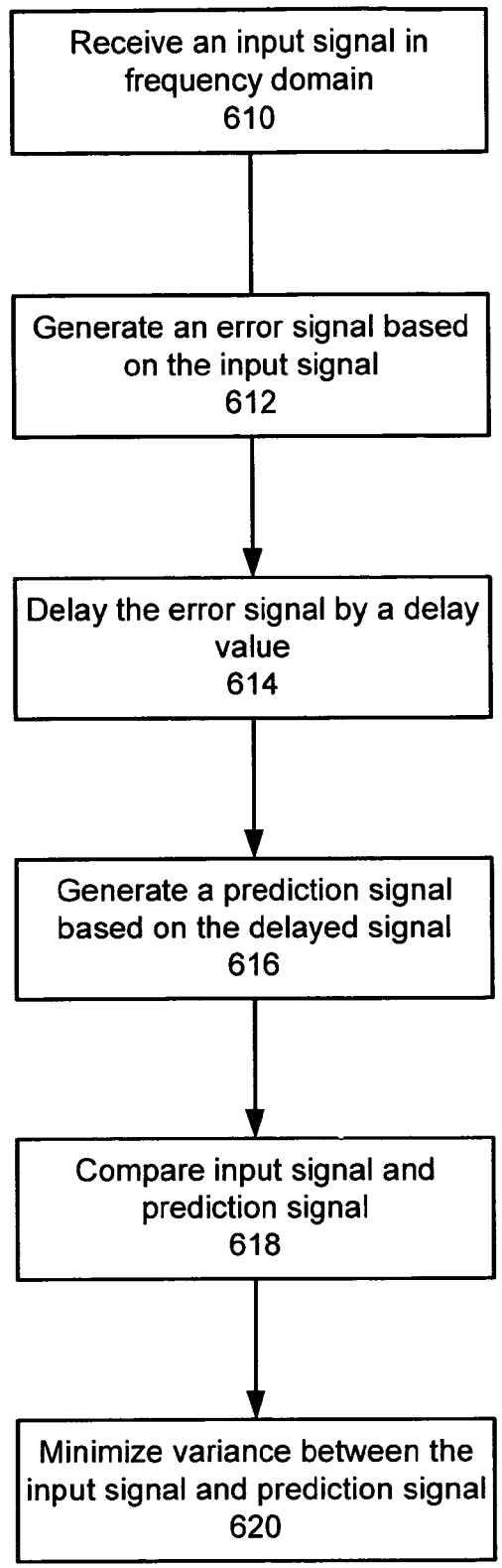
FIG. 6 is a flowchart illustrating a method for reducing interference due to handshake tones in the frequency domain according to an embodiment of the present inventions.

FIG. 6 is a flowchart illustrating a method for reducing interference due to handshake tones in the frequency domain according to an embodiment of the present inventions. At step 610, an input signal may be received in the frequency domain. The input signal may include a short correlation time component and a long correlation time component. At step 612, an error signal may be generated based at least in part on the input signal. The error signal may comprise a residual noise component and the long correlation time component. At step 614, the error signal may be delayed by a delay value. The delay value may be a predetermined time-symbol value. Further, the delay value may be a symbol wherein the symbol represents approximately 512 time domain samples. As recognized by an embodiment of the present invention, a shift of one symbol achieves a zero or near zero correlation of the short correlation time component, as discussed above. At step 616, a prediction signal may be generated wherein the prediction signal is based at least in part on the delayed signal. For example, the prediction signal may be generated by a causal filter. The causal filter may use historical data to generate the prediction signal. Further, the causal filter may use at least one past disturbance signal to generate the prediction signal. At step 416, the input signal and the prediction signal may be compared. At step 620, the variance between the input signal and the prediction signal may be minimized. The variance may be minimized by an algorithm, such as a least mean square algorithm.

The embodiments of the present inventions sets forth systems and methods for modifying the existing G.992.1, G.992.2, and G.994.1 Recommendations as presented by the ITU-T for the purposes of increasing ADSL system performance and reach in geographic regions falling under the requirements of Annex C to the G.992.1 Recommendation. In accordance with the present inventions, such modifications relate to the reduction of crosstalk interferences due to handshake tones.

As discussed above, the method and system for reducing interference due to handshake tones may be incorporated at the CO end and at the CPE end. The CO end and the CPE end may include a modem, transceiver or other communication device.

While the foregoing description includes many details and specificities, it is to be understood that these have been included for purposes of explanation only, and are not to be interpreted as limitations of the present inventions. Many modifications to the embodiments described above can be made without departing from the spirit and scope of the inventions.

The present inventions are not to be limited in scope by the specific embodiments described herein. Indeed, various modifications of the present inventions, in addition to those described herein, will be apparent to those of ordinary skill in the art from the foregoing description and accompanying drawings. Thus, such modifications are intended to fall within the scope of the following appended claims. Further, although the present inventions have been described herein in the context of a particular implementation in a particular environment for a particular purpose, those of ordinary skill in the art will recognize that its usefulness is not limited thereto and that the present inventions can be beneficially implemented in any number of environments for any number of purposes. Accordingly, the claims set forth below should be construed in view of the full breath and spirit of the present inventions as disclosed herein.

The invention claimed is:

1. A method for reducing interference due to handshake tones in the frequency domain in a communication system, the method comprising the steps of:
   receiving an input signal $X_t$ in the frequency domain at bin q and time-symbol t, wherein the input signal comprises a short correlation time component and a long correlation time component, wherein the long correlation time component corresponds to a disturbance signal due to handshake tones;
   attaining near zero correlation for the short correlation time component in the received input signal by delaying the input signal by a time-symbol value N, wherein N is an integer such that the generated delayed signal is $X_{t-N}$;
   estimating the disturbance signal by generating a prediction signal with long correlation properties based at least in part on the delayed signal;
   comparing the input signal and the prediction signal; and
   correlating the received input signal to the disturbance signal by reducing a variance between the received input signal and the prediction signal,
   wherein the steps are performed in a transceiver within the communication system.

2. The method of claim 1, wherein the input signal is a corrupted frequency domain Asymmetric Digital Subscriber Line (ADSL) signal at a predetermined bin of a predetermined time-symbol.

3. The method of claim 1, wherein the time-symbol value N is one symbol, wherein the one symbol represents approximately 512 time domain samples.

4. The method of claim 1, wherein near-end crosstalk (NEXT) interferences due to handshake tones are reduced.

5. The method of claim 1, wherein far-end crosstalk (FEXT) interferences due to handshake tones are reduced.

6. The method of claim 1, wherein the steps are performed at a customer premises equipment (CPE) end.

7. The method of claim 1, wherein the steps are performed at a central office (CO) end.

8. The method of claim 1, wherein the prediction signal is generated by a causal filter.

9. The method of claim 1, wherein the causal filter uses historical data to generate the prediction signal.

10. The method of claim 1, wherein the causal filter uses at least one past disturbance signal to generate the prediction signal.

11. The method of claim 1, wherein the step of reducing is performed by at a least mean square algorithm.

12. A system for reducing interference due to handshake tones in the frequency domain, the system comprising:
   an input for receiving an input signal in the frequency domain having a short correlation time component and a long correlation time component, wherein the long correlation time component corresponds to a disturbance signal due to handshake tones;
   a delay module for generating a delayed signal by delaying the input signal by a delay value equal to an upper bound of the short correlation component; and
   a filter for generating a prediction signal based at least in part on the delayed signal to estimate the disturbance signal;
   wherein the input signal and the prediction signal are compared and a variance between the input signal and the prediction signal is reduced.

13. The system of claim 12, wherein the input signal is a corrupted frequency domain Asymmetric Digital Subscriber Line (ADSL) signal at a predetermined bin of a predetermined time-symbol.

14. The system of claim 12, wherein the delay value is a time-symbol value.

15. The system of claim 12, wherein the delay value is one symbol, wherein the one symbol represents approximately 512 time domain samples.

16. The system of claim 12, wherein the delay value comprises a predetermined time symbol value.

17. The system of claim 12, wherein near-end crosstalk (NEXT) interferences due to handshake tones are reduced.

18. The system of claim 12, wherein far-end crosstalk (FEXT) interferences due to handshake tones are reduced.

19. The system of claim wherein the system resides at a customer premises equipment (CPE) end.

20. The system of claim 12, wherein the system resides at a central office (CO) end.

21. The system of claim 12, wherein the prediction signal is generated by a causal filter.

22. The system of claim 21, wherein the causal filter uses historical data to generate the prediction signal.

23. The system of claim 21 wherein the causal filter uses at least one past disturbance signal to generate the prediction signal.

24. The system of claim 12, wherein the variance is reduced by a least mean square algorithm.

25. The system of claim 12, wherein the input is correlated to a disturbance signal.

26. A system for reducing interference due to handshake tones in the time domain, comprising:
- means for receiving an input signal in the frequency domain having a short correlation time component and a long correlation time component;
- means for generating a delayed signal by delaying the input signal by a delay value, wherein the delay value is equal to a time-symbol value N, wherein N is an integer such that the generated delayed signal is $X_{t-N}$, wherein $X_t$ is the input signal at bin q and time-symbol t, wherein the value N is based on an upper bound of the short correlation time component, and wherein the long correlation time component exhibits high correlation beyond the upper bound;
- means for generating a prediction signal with a high correlation value based at least in part on the delayed signal;
- means for comparing the input signal and the prediction signal; and
- means for reducing a variance between the input signal and the prediction signal.

* * * * *

UNITED STATES PATENT AND TRADEMARK OFFICE
CERTIFICATE OF CORRECTION

PATENT NO.         : 7,764,752 B2
APPLICATION NO.    : 10/672079
DATED              : July 27, 2010
INVENTOR(S)        : Langberg et al.

It is certified that error appears in the above-identified patent and that said Letters Patent is hereby corrected as shown below:

Column 9, line 49: delete "$X_t$," and replace with "$X_t[q]$"
Column 9, line 58: delete "$X_{t-N}$ and replace with "$X_{t-N}[q]$"
Column 10, line 18: delete "claim 1" and replace with "claim 8"
Column 10, line 20: delete "claim 1" and replace with "claim 8"
Column 11, line 13: delete "$X_{t-N}$" and replace with "$X_{t-N}[q]$"
Column 11 line 13: delete "$X_t$ and replace with "$X_t[q]$"

Signed and Sealed this
Twenty-second Day of November, 2011

David J. Kappos
*Director of the United States Patent and Trademark Office*